United States Patent
Wang

(10) Patent No.: US 9,933,659 B2
(45) Date of Patent: Apr. 3, 2018

(54) POLARIZATION BEAM SPLITTER, BACKLIGHT MODULE AND LIQUID CRYSTAL DISPLAY APPARATUS

(71) Applicant: BOE Technology Group Co., Ltd., Beijing (CN)

(72) Inventor: Shang Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 620 days.

(21) Appl. No.: 14/500,036

(22) Filed: Sep. 29, 2014

(65) Prior Publication Data
US 2015/0323804 A1    Nov. 12, 2015

(30) Foreign Application Priority Data

May 7, 2014    (CN) .......................... 2014 1 0189821

(51) Int. Cl.
*G02F 1/335*    (2006.01)
*G02F 1/1335*    (2006.01)
(Continued)

(52) U.S. Cl.
CPC ............ *G02F 1/13362* (2013.01); *F21V 9/14* (2013.01); *G02B 27/283* (2013.01);
(Continued)

(58) Field of Classification Search
CPC ..... G02F 2001/13355; G02F 1/133504; G02F 2001/133607
(Continued)

(56) References Cited

U.S. PATENT DOCUMENTS

| 4,989,076 A | 1/1991 | Owada et al. |
| 5,422,756 A * | 6/1995 | Weber .................... G02B 5/124 |
| | | 359/485.03 |

(Continued)

FOREIGN PATENT DOCUMENTS

| CN | 1900785 A | 1/2007 |
| CN | 101576630 A | 11/2009 |

(Continued)

OTHER PUBLICATIONS

Office Action from Chinese Patent Application No. 201410189821.4, dated Apr. 19, 2016.
(Continued)

*Primary Examiner* — Wen-Ying P Chen
(74) *Attorney, Agent, or Firm* — Westman, Champlin & Koehler, P.A.

(57) ABSTRACT

The present disclosure provides a polarization beam splitter, a backlight module and a liquid crystal display apparatus. The polarization beam splitter comprises a second prism group and a first prism group formed sequentially from a light incidence side to a light outgoing side and meshing with each other; and a polarization beam splitting layer arranged on a meshing surface of the first or second prism group and configured to allow a first polarized light in an incident light to be transmitted through the polarization beam splitting layer to exit from the light outgoing side while reflecting a second polarized light in the incident light back to the light incidence side, the second polarized light having a polarization direction perpendicular to that of the first polarized light.

14 Claims, 3 Drawing Sheets

(51) Int. Cl.
*G02B 27/28* (2006.01)
*F21V 9/14* (2006.01)

(52) U.S. Cl.
CPC .................. *G02F 1/133504* (2013.01); *G02F 2001/13355* (2013.01); *G02F 2001/133607* (2013.01)

(58) Field of Classification Search
USPC .......................................................... 349/62
See application file for complete search history.

(56) References Cited

U.S. PATENT DOCUMENTS

| | | | |
|---|---|---|---|
| 5,587,816 A * | 12/1996 | Gunjima | .................. F21V 9/14 349/113 |
| 9,001,279 B2 | 4/2015 | Kobayashi et al. | |
| 2004/0061937 A1* | 4/2004 | Masubuchi | ............ G02B 5/285 359/485.06 |
| 2007/0030566 A1* | 2/2007 | Chang | .................. G02B 27/285 359/489.06 |
| 2012/0092589 A1 | 4/2012 | Ma | |

FOREIGN PATENT DOCUMENTS

| | | |
|---|---|---|
| CN | 201820036 U | 5/2011 |
| CN | 102608747 | 7/2012 |
| CN | 103713395 A | 4/2014 |
| DE | 935 663 | 11/1955 |
| DE | 935663 C | 11/1955 |

OTHER PUBLICATIONS

Decision of Rejection for Chinese Patent Application No. 201410189821.4, dated Aug. 1, 2016, 10 pages.
First Office Action, including Search Report, for Chinese Patent Application No. 201410189821.4, dated Sep. 30, 2015, 13 pages.
Second Office Action, including Search Report, for Chinese Patent Application No. 201410189821.4, dated Feb. 5, 2016, 11 pages.

* cited by examiner

POLARIZATION BEAM SPLITTER, BACKLIGHT MODULE AND LIQUID CRYSTAL DISPLAY APPARATUS

CROSS-REFERENCE TO RELATED APPLICATION

This application claims the benefit of Chinese Patent Application No. 201410189821.4 filed on May 7, 2014 in the State Intellectual Property Office of China, the whole disclosure of which is incorporated herein by reference.

BACKGROUND OF THE INVENTION

Field of the Invention

The present disclosure relates to the technical field of liquid crystal display, in particular, a polarization beam splitter, a backlight module and a liquid crystal display apparatus.

Description of the Related Art

A liquid crystal display (LCD) includes a liquid crystal display panel and a backlight module. An upper polarization film and a lower polarization film are attached to two faces of the liquid crystal display panel respectively. In accordance with the display principle of the liquid crystal display, the upper polarization film and the lower polarization film typically have light polarization directions perpendicular to each other. Liquid crystal injected into the liquid crystal display panel cannot emit light by itself, but the liquid crystal display panel is lit by a surface light source provided by the backlight module such that the liquid crystal display achieves the displaying effects. Therefore, the technology of the backlight module directly affects the appearance of the liquid crystal display in brightness and color.

The backlight module is classified into two types, i.e., direct illumination type backlight module and side illumination type backlight module, on the basis of the incidence position of a light source. In the direct illumination type backlight module, the light source is arranged below the backlight module, and the light emitted by the light source exits from the front surface after being reflected by a reflecting plate and then diffused homogeneously by a diffusion plate. No light guide plates are provided in the direct illumination type backlight module. In the side illumination type backlight module, the light sources are arranged at the sides of the backlight module, and the light emitted from the light source is converted by the light guide plate from the form of linear light source into the form of surface light source with a homogeneous light distribution, and exits from the backlight module after being homogenized by the diffusion sheet and being collected by prisms. The light exiting from the backlight module is polarized by the lower polarization film such that the light with the polarization direction parallel to the direction of grids in the lower polarization film passes through the lower polarization film and enters the liquid crystal display panel and then deflected by liquid crystal molecules to exit through the upper polarization film. In this way, an image can be displayed.

The display brightness is one of critical parameters for estimating the display effects of the liquid crystal display. How to improve the display brightness has drawn wide attention by liquid crystal display manufacturers. The backlight module typically uses a cold cathode fluorescent lamp (CCFL) or a light emitting diode (LED) as a light source. Such light source emits the light similar to natural light without the specified polarization direction. The light emitted by such light source may be decomposed into two polarization beam with polarization directions perpendicular to each other and same energy by the polarization film close to one side of the backlight module. The polarized light with the same polarization direction as that of the polarization film can pass the polarization film to light the liquid crystal display while the polarized light with the polarization direction opposed to that of the polarization film cannot pass the polarization film. Thus, the ratio of utilization of the light emitted from the light source is only one half.

SUMMARY OF THE INVENTION

An embodiment of the present invention provides a polarization beam splitter, a backlight module and a liquid crystal display apparatus, which may improve the ratio of utilization of the light emitted from the light source.

The present invention may be implemented as the following embodiments.

In an embodiment, a polarization beam splitter is provided, comprising:

a second prism group and a first prism group formed sequentially from a light incidence side to a light outgoing side and meshing with each other; and a polarization beam splitting layer arranged on a meshing surface of the first prism group or the second prism group and configured to allow a first polarized light in an incident light to be transmitted through the polarization beam splitting layer to exit from the light outgoing side while reflecting a second polarized light in the incident light back to the light incidence side, the second polarized light having a polarization direction perpendicular to that of the first polarized light.

In an embodiment, a backlight module is also provided, comprising:

a polarization beam splitter comprising:
  a second prism group and a first prism group formed sequentially from a light incidence side to a light outgoing side and meshing with each other; and
  a polarization beam splitting layer arranged on a meshing surface of the first prism group or the second prism group and configured to allow a first polarized light in an incident light to be transmitted through the polarization beam splitting layer to exit from the light outgoing side while reflecting a second polarized light in the incident light back to the light incidence side, the second polarized light having a polarization direction perpendicular to that of the first polarized light.

In an embodiment, a liquid crystal display apparatus is also provided, comprising
a backlight module comprising:
a polarization beam splitter comprising:
  a second prism group and a first prism group formed sequentially from a light incidence side to a light outgoing side and meshing with each other; and
  a polarization beam splitting layer arranged on a meshing surface of the first prism group or the second prism group and configured to allow a first polarized light in an incident light to be transmitted through the polarization beam splitting layer to exit from the light outgoing side while reflecting a second polarized light in the incident light back to the light incidence side, the second polarized light having a polarization direction perpendicular to that of the first polarized light.

BRIEF DESCRIPTION OF THE DRAWINGS

The above and other features of the present invention will become more apparent by describing in detail exemplary embodiments thereof with reference to the accompanying drawings. Throughout the drawings, same reference numerals represent same or similar members.

DETAILED DESCRIPTION OF PREFERRED EMBODIMENTS OF THE INVENTION

Figure 1:
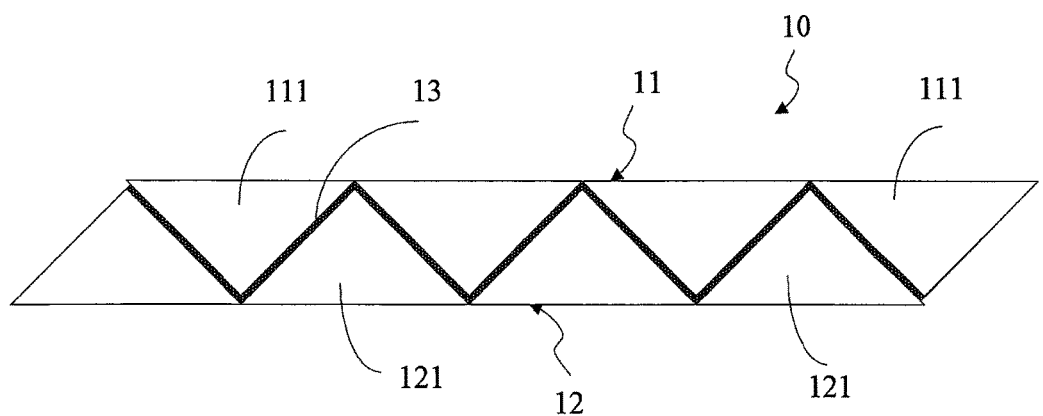
FIG. 1 is a schematic view showing a structure of a polarization beam splitter according to an embodiment of the present invention.

The embodiments of the present invention will be further explained below with reference to the figures and examples. It should be noted that same or similar reference numerals represent same or similar members or those having same or similar functions. The following embodiments are only explained by way of examples, instead of being intended to limit the scope of the present invention.

In accordance with a general invention concept of the present disclosure, a polarization beam splitter is provided, comprising: a second prism group and a first prism group formed sequentially from a light incidence side to a light outgoing side and meshing with each other; and a polarization beam splitting layer arranged on a meshing surface of the first prism group or the second prism group and configured to allow a first polarized light in an incident light to be transmitted through the polarization beam splitting layer to exit from the light outgoing side while reflecting a second polarized light in the incident light back to the light incidence side, the second polarized light having a polarization direction perpendicular to that of the first polarized light.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

With reference to FIG. 1, an embodiment of the present invention provides a polarization beam splitter 10. It includes a second prism group 12 and a first prism group 11 formed sequentially from a light incidence side to a light outgoing side and meshing with each other.

The polarization beam splitter 10 may include a polarization beam splitting layer 13 arranged between the second prism group 12 and the first prism group 11. The polarization beam splitting layer 13 may be arranged on a meshing surface of the first prism group 11 or the second prism group 12 and configured to allow a first polarized light in the incident light to be transmitted through the polarization beam splitting layer 13 to exit from the light outgoing side while reflecting a second polarized light in the incident light back to the light incidence side of the polarization beam splitter 10, the second polarized light having a polarization direction perpendicular to that of the first polarized light.

As an example, the first prism group 11 and the second prism group 12 may be formed by an array of a plurality of prisms spaced to each other. For example, as illustrated in FIG. 1, the first prism group 11 includes a plurality of prisms 11 and the second prism group 12 includes a plurality of prisms 121. As an example, all of prisms in the first prism group 11 and the second prism group 12 have triangular sections, and the sum of an apex angle of each of prisms of the first prism group 11 and two base angles of each of prisms of the second prism group 12 is approximately 180 degrees.

In an embodiment of the present invention, the polarization beam splitter 10 includes the first prism group 11 and the second prism group 12 meshing with each other and the polarization beam splitting layer 13 arranged between the two prism groups to allow the first polarized light to pass therethrough while reflecting the second polarized light back to the light incidence side for reutilization, thus the ratio of utilization of the incident light can be improved.

Figure 2:
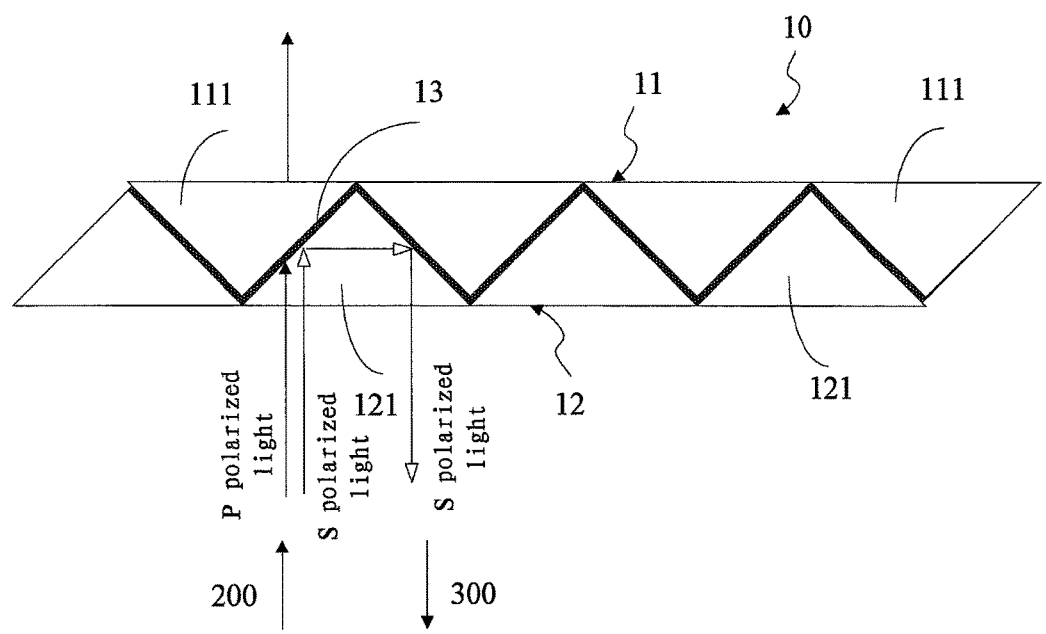
FIG. 2 is a schematic view showing an optical path for the light illuminated on the polarization beam splitter according to an embodiment of the present invention.

As an example, each prism of the first prism group 11 and second prism group 12 may have a section with a shape of an triangle, such as an isosceles triangle, for example an isosceles right triangle. As an example, apex angles at which the prisms mesh with each other may be right angles. In an embodiment of the present invention, the apex angles at which the prisms mesh with each other are right angles and each of their sections has a shape of an isosceles triangle, thus two base angles of the triangular section are 45 degrees. In this way, the outgoing direction of the second polarized light reflected twice is opposite to the incident direction of the incident light, i.e., the second polarized light reflected by the polarization beam splitter returns to the light incidence side. With reference to FIG. 2, it shows schematically that the light is incident on the polarization beam splitter 10. The incident light travels in a first direction 200 and is decomposed into P polarized light (the first polarized light) and S polarized light (the second polarized light) by the second prism group 12. The P polarized light passes through the polarization beam splitting layer 13 and exits from the first prism group 11. The S polarized light is reflected by the polarization beam splitting layer 13 twice and return to exit from the polarization beam splitter 10 in a second direction 300. Apparently, the light travelling in the second direction 300 may be reused.

In an embodiment of the present invention, base angles of all of the prisms in the first prism group 11 and the second prism group 12 may be substantially equal to a Brewster's angle for the incident light being incident onto an interface of the polarization beam splitting layer 13 from the second prism group 12. It means that if the incident light is incident on a bottom surface of the second prism group 12, as illustrated in FIG. 2, the angle at which the incident light is irradiated on the polarization beam splitting layer 13 through the second prism group 12 is substantially equal to the Brewster's angle. It may improve the efficiency of beam splitting of the incident light. In the case that each prism of the first prism group 11 and second prism group 12 has a section with a shape of an isosceles right triangle, the Brewster's angle may be 45 degrees. In the embodiment, when the Brewster's angle for the incident light being incident onto an interface of the polarization beam splitting layer 13 from the second prism group 12 is 45 degrees, it is optimal to transmit the first polarized light and reflect the second polarized light to improve the efficiency of beam splitting of the incident light. The Brewster's angle depends on the refractive indexes of the media on both sides of the interface between the second prism group 12 and the polarization beam splitting layer 13. However, it should be noted that the Brewster's angle is not limited to this.

As an example, the polarization beam splitting layer 13 has a multi-film composite structure composed of glass, $TiO_2$ and $SiO_2$. As an example, the films in the multi-film composite structure of the polarization beam splitting layer 13 may be formed on the basis of a predetermined rule, for example interference principle, to produce antireflection effects for the incident light, for example, the first polarized light through the polarization beam splitting layer 13.

As an example, the multi-film composite structure of the polarization beam splitting layer 13 may include a first glass layer, a first $TiO_2$ layer, a second glass layer and a plurality of composite layers between the first $TiO_2$ layer and the second glass layer, each of the composite layers including a $SiO_2$ layer and a $TiO_2$ layer.

Figure 3:
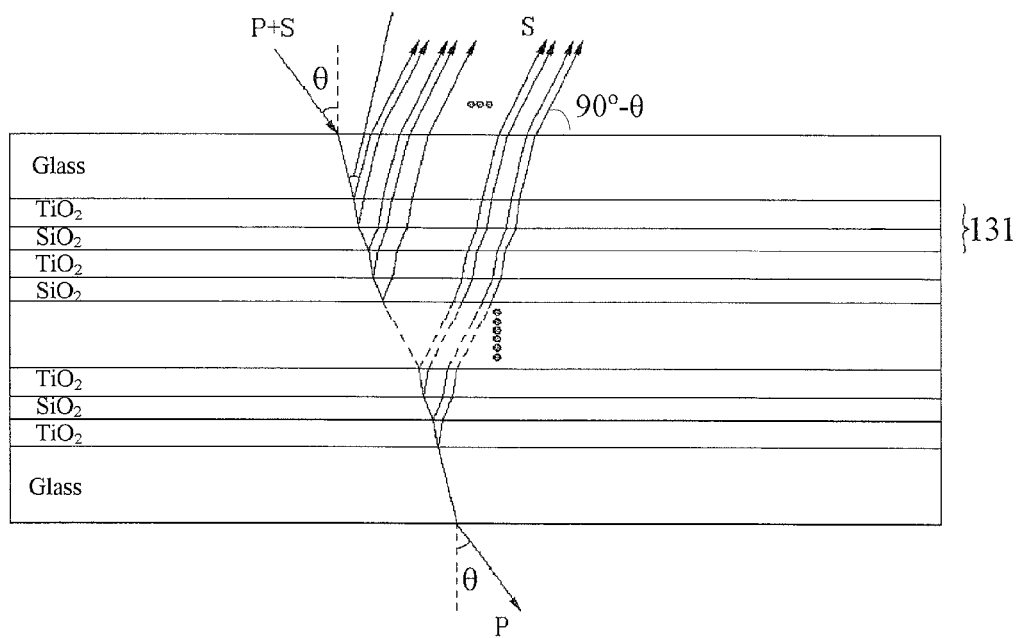
FIG. 3 is a schematic view showing an optical path for the incident light in the polarization beam splitting layer according to an embodiment of the present invention.

With reference to the schematic view showing an optical path for the incident light in the polarization beam splitting layer shown in FIG. 3, the polarization beam splitting layer 13 has a multi-film composite structure, which includes the composite layer 131 composed of the $SiO_2$ layer and the $TiO_2$ layer. The incident light is composed of the P polarized light (the first polarized light) and the S polarized light (the second polarized light). When the incident light is incident at angle of θ, the P polarized light is transmitted completely while the S polarized light is reflected completely.

It should be noted that the thickness of the polarization beam splitting layer 13 generally depends on the incident light provided by the light source. For example, if the light source provides the natural light or the light similar to the natural light, the thickness of the polarization beam splitting layer 13 may be ¼ of wavelength of a principal light wave of the incident light. According to the optical interference principle, laminated film layers with the thickness of ¼ of wavelength may have antireflection effect. In this way, the P polarized light may be transmitted completely in essential while the S polarized light may be reflected completely in essential.

Figure 4:
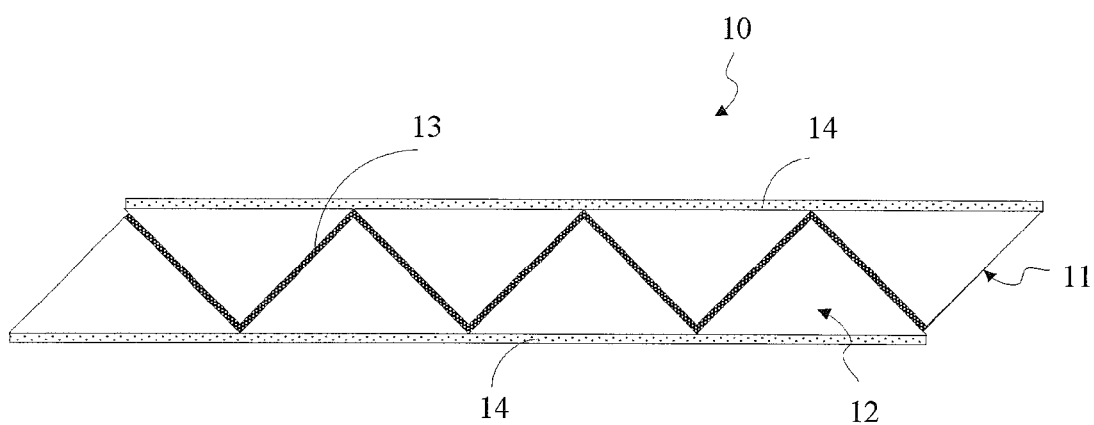
FIG. 4 is a schematic view showing a structure of another polarization beam splitter according to an embodiment of the present invention.

As illustrated in FIG. 4, in order to protect the polarization beam splitter 10, it may further comprise transparent protective layers 14, for example, two transparent protective layers 14, arranged on non-meshing surfaces or sides of the first prism group 11 and second prism group 12 respectively. The meshing surface of the first prism group 11 or the second prism group 12 may be configured to receive the polarization beam splitting layer 13.

In an embodiment of the present invention, the polarization beam splitter 10 includes the first prism group 11 and the second prism group 12 meshing with each other and the polarization beam splitting layer 13 arranged between the two prism groups to allow the first polarized light to pass therethrough while reflecting the second polarized light back to the light incidence side. When the polarization beam splitter 10 is used in the backlight module, the returned second polarized light may be reused, thus the ratio of utilization of the incident light can be improved.

Figure 5:
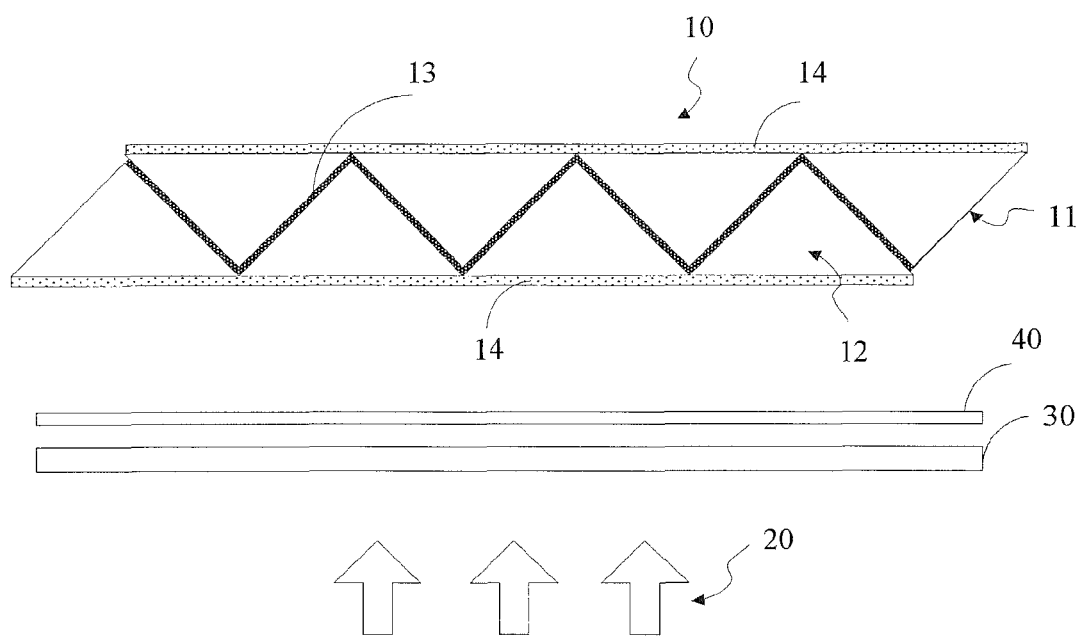
FIG. 5 is a schematic view showing a structure of a backlight module according to an embodiment of the present invention.

An embodiment of the present invention provides a backlight module including the polarization beam splitter 10 as described in any of the above embodiments. As an example, with reference to the FIG. 5, the backlight module may further comprise a light source 20 configured to supply the incident light, a light guide plate 30 and a bottom reflecting layer 40. The light guide plate 30 is arranged between the light source 20 and the polarization beam splitter 10. The bottom reflecting layer 40 is arranged between the light guide plate 30 and the polarization beam splitter 10 and configured to allow the incident light supplied by the light source 20 to pass through it while reflecting the second polarized light reflected by the polarization beam splitter 10 back to the light incidence side of the polarization beam splitter 10, for example, the second polarized light returns to the light incidence side of the polarization beam splitter 10 in a form of natural light, or partial polarized light or circularly polarized light.

As an example, the bottom reflecting layer 40 is formed by one-sided transmission material, which allows the incident light (for example traveling along the first direction 200) supplied by the light source 20 to be transmitted while reflecting the light in an opposite direction (for example traveling along the second direction 300).

As an example, the light source 20 may be a LED light source, a CCFL light source or a laser light source.

In an embodiment of the present invention, the polarization beam splitter 10 includes two prism groups meshing with each other and the polarization beam splitting layer 13 arranged between the two prism groups to allow the first polarized light to pass while reflecting the second polarized light back to the light incidence side in the direction opposite to that of the incident light. When the polarization beam splitter 10 is used in the backlight module, the returned second polarized light may be reused. For example, it may be incident on the light incidence side of the polarization beam splitter 10 again after being reflected by the bottom reflecting layer 40, e.g., it may become natural light, or partial polarized light or circularly polarized light. Thus, the ratio of utilization of the incident light can be improved.

An embodiment of the present invention also provides a liquid crystal display apparatus including the backlight module as described in any of the above embodiments.

In an embodiment of the present invention, the polarization beam splitter 10 includes two prism groups meshing with each other and the polarization beam splitting layer 13 arranged between the two prism groups to allow the first polarized light to pass therethrough while reflecting the second polarized light back to the light incidence side in the direction opposite to that of the incident light. When the polarization beam splitter 10 is used in the backlight module, the returned second polarized light may be reused. For example, it may be incident on the light incidence side of the polarization beam splitter again after being reflected by the bottom reflecting layer. Thus, the ratio of utilization of the incident light can be improved.

Although several exemplary embodiments have been shown and described, the present invention is not limited to those and it would be appreciated by those skilled in the art that various changes or modifications may be made in these embodiments without departing from the principles and spirit of the disclosure, which should fall within the scope of the present invention. The scope of the invention is defined in the claims and their equivalents.

What is claimed is:

1. A polarization beam splitter comprising:
    a second prism group and a first prism group formed sequentially from a light incidence side to a light outgoing side and meshing with each other; and a polarization beam splitting layer arranged on a meshing surface of the first prism group or the second prism group and configured to allow a first polarized light in an incident light to be transmitted through the polarization beam splitting layer to exit from the light outgoing side while reflecting a second polarized light in the incident light back to the light incidence side, the second polarized light having a polarization direction perpendicular to that of the first polarized light, wherein all of prisms in the first prism group and the second prism group have triangular sections, and wherein base angles of all of the prisms in the first prism group and the second prism group are substantially equal to a Brewster's angle for the incident light being incident onto an interface of the polarization beam splitting layer from the second prism group; and wherein the polarization beam splitting layer has a multi-film composite structure composed of glass, $TiO_2$ and $SiO_2$.

2. The polarization beam splitter according to claim 1, wherein each prism of the first and second prism groups has a section with a shape of an isosceles right triangle, apex angles at which the prisms mesh with each other being right angles.

3. The polarization beam splitter according to claim 2, wherein the Brewster's angle for the incident light being incident onto an interface of the polarization beam splitting layer from the second prism group is 45 degrees.

4. The polarization beam splitter according to claim 1, wherein the multi-film composite structure of the polarization beam splitting layer comprises a first glass layer, a first $TiO_2$ layer, a second glass layer and a plurality of composite layers between the first $TiO_2$ layer and the second glass layer, each of the composite layers comprising a $SiO_2$ layer and a $TiO_2$ layer.

5. The polarization beam splitter according to claim 1, further comprising transparent protective layers arranged on non-meshing surfaces of the first and second prism groups respectively.

6. The polarization beam splitter according to claim 1, wherein the polarization beam splitting layer has a thickness of ¼ of wavelength of a principal light wave of the incident light.

7. A backlight module comprising:
a polarization beam splitter comprising:
a second prism group and a first prism group formed sequentially from a light incidence side to a light outgoing side and meshing with each other; and
a polarization beam splitting layer arranged on a meshing surface of the first prism group or the second prism group and configured to allow a first polarized light in an incident light to be transmitted through the polarization beam splitting layer to exit from the light outgoing side while reflecting a second polarized light in the incident light back to the light incidence side, the second polarized light having a polarization direction perpendicular to that of the first polarized light, wherein all of prisms in the first prism group and the second prism group have triangular sections, and wherein base angles of all of the prisms in the first prism group and the second prism group are substantially equal to a Brewster's angle for the incident light being incident onto an interface of the polarization beam splitting layer from the second prism group; and
wherein the polarization beam splitting layer has a multi-film composite structure composed of glass, $TiO_2$ and $SiO_2$.

8. The backlight module according to claim 7, further comprising:
a light source configured to supply the incident light;
a light guide plate arranged between the light source and the polarization beam splitter; and
a bottom reflecting layer arranged between the light guide plate and the polarization beam splitter and configured to allow the incident light supplied by the light source to pass therethrough while reflecting the second polarized light reflected by the polarization beam splitter back to the light incidence side of the polarization beam splitter.

9. The backlight module according to claim 7, wherein each prism of the first and second prism groups has a section with a shape of an isosceles right triangle, apex angles at which the prisms mesh with each other being right angles.

10. The backlight module according to claim 7, wherein the multi-film composite structure of the polarization beam splitting layer comprises a first glass layer, a first $TiO_2$ layer, a second glass layer and a plurality of composite layers between the first $TiO_2$ layer and the second glass layer, each of the composite layers comprising a $SiO_2$ layer and a $TiO_2$ layer.

11. The backlight module according to claim 8, wherein the bottom reflecting layer is formed by one-sided transmission material.

12. The backlight module according to claim 7, wherein the light source is a LED light source, a CCFL light source or a laser light source.

13. A liquid crystal display apparatus comprising
a backlight module comprising:
a polarization beam splitter comprising:
a second prism group and a first prism group formed sequentially from a light incidence side to a light outgoing side and meshing with each other; and
a polarization beam splitting layer arranged on a meshing surface of the first prism group or the second prism group and configured to allow a first polarized light in an incident light to be transmitted through the polarization beam splitting layer to exit from the light outgoing side while reflecting a second polarized light in the incident light back to the light incidence side, the second polarized light having a polarization direction perpendicular to that of the first polarized light, wherein all of prisms in the first prism group and the second prism group have triangular sections, and wherein base angles of all of the prisms in the first prism group and the second prism group are substantially equal to a Brewster's angle for the incident light being incident onto an interface of the polarization beam splitting layer from the second prism group; and
wherein the polarization beam splitting layer has a multi-film composite structure composed of glass, $TiO_2$ and $SiO_2$.

14. The liquid crystal display apparatus according to claim 13, wherein the backlight module further comprises:
a light source configured to supply the incident light;
a light guide plate arranged between the light source and the polarization beam splitter; and
a bottom reflecting layer arranged between the light guide plate and the polarization beam splitter and configured to allow the incident light supplied by the light source to pass therethrough while reflecting the second polarized light reflected by the polarization beam splitter back to the light incidence side of the polarization beam splitter.

* * * * *